(12) United States Patent
Rader (10) Patent No.: US 8,982,672 B2
(45) Date of Patent: Mar. 17, 2015

(54) ANIMAL MEDICINE REMINDER TAG

(75) Inventor: Linda Kathryn Rader, Alpharetta, GA (US)

(73) Assignee: Merial, Inc., Duluth, GA (US)

( * ) Notice: Subject to any disclaimer, the term of this patent is extended or adjusted under 35 U.S.C. 154(b) by 297 days.

(21) Appl. No.: 13/420,217

(22) Filed: Mar. 14, 2012

(65) Prior Publication Data

US 2012/0236690 A1 Sep. 20, 2012

Related U.S. Application Data

(60) Provisional application No. 61/452,185, filed on Mar. 14, 2011.

(51) Int. Cl.
*G04F 3/06* (2006.01)
*A01K 27/00* (2006.01)
*G04F 1/00* (2006.01)

(52) U.S. Cl.
CPC ............. *A01K 27/006* (2013.01); *A01K 27/009* (2013.01); *G04F 1/005* (2013.01); *G04F 3/06* (2013.01)
USPC ............................ 368/10; 368/89; 340/309.16

(58) Field of Classification Search
CPC ........................................................ G04F 3/06
USPC ..................................................... 340/309.16
See application file for complete search history.

(56) References Cited

U.S. PATENT DOCUMENTS

| | | | |
|---|---|---|---|
| 4,367,955 A * | 1/1983 | Ballew ............................ 368/10 |
| 4,726,001 A * | 2/1988 | Drakulich ..................... 368/110 |
| 5,625,606 A * | 4/1997 | Openiano ....................... 368/10 |
| 5,752,335 A | 5/1998 | Shimogori |
| 5,861,787 A * | 1/1999 | Graeber ........................ 335/154 |
| 6,329,918 B1 | 12/2001 | Moyer |
| 6,502,060 B1 | 12/2002 | Christian |
| 6,568,354 B1 | 5/2003 | Wasserman |
| 6,665,966 B1 | 12/2003 | Beck |
| 7,109,847 B1 * | 9/2006 | Hill et al. ................. 340/309.16 |
| 2002/0036569 A1 | 3/2002 | Martin |
| 2002/0180591 A1 | 12/2002 | Berstling |
| 2006/0145820 A1 * | 7/2006 | Rosche .................... 340/309.16 |
| 2009/0201773 A1 | 8/2009 | Wilson |

FOREIGN PATENT DOCUMENTS

| | | |
|---|---|---|
| GB | 2325328 A | 11/1998 |
| GB | 02341379 A | 3/2000 |
| WO | WO03087955 A1 | 10/2003 |
| WO | WO2010001314 A1 | 1/2010 |

* cited by examiner

*Primary Examiner* — Amy Cohen Johnson
*Assistant Examiner* — Jason Collins
(74) *Attorney, Agent, or Firm* — Judy Jarecki-Black; Peter Dolan; Merial, Inc.

(57) ABSTRACT

An animal medicine reminder tag that is non-toxic, water resistant, and shock resistant, wherein the tag is automatically activated when attached to the companion animal and cannot be reset or turned off by the companion animal's caregiver. The tag is designed to be minimally harmful if accidentally swallowed by the companion animal.

25 Claims, 5 Drawing Sheets

ANIMAL MEDICINE REMINDER TAG

INCORPORATION BY REFERENCE

This application claims priority to U.S. provisional application No. 61/452,185, filed Mar. 14, 2011, the disclosure of which is herein incorporated by reference in its entirety.

FIELD OF THE INVENTION

The present invention relates to timer devices and, more particularly, to an electronic reminder device to remind a person to engage in an activity at a particular time such as dispensing medication to a companion animal.

BACKGROUND OF THE INVENTION

A large and increasing number of effective medications is available to treat and prevent a wide variety of diseases, infections, infestations and other veterinary conditions effecting companion animals. In fact, the strong demand for drugs that improve the lives of people's pets has fueled the development of a global market valued in excess of ten billion USD. However, compliance remains a significant challenge. Many medications, such as those that treat and/or prevent the infestation of ectoparasites, like ticks and fleas, must be administered at regular time intervals, for example, once per month. Failure to timely administer medications to companion animals, such as dogs, can have devastating consequences, most severely including prolonged extreme discomfort and even death due to heartworm infestation. Compliance with FRONTLINE® and HEARTGARD®/CARDOMEC®/CARDOTEK® products (Merial Limited) varies by country. Current estimates indicate compliance is 2 doses per year (Brazil), 5 doses per year (Australia), and 4 doses per year (United States). Effective dosing reminders could increase compliance and significantly improve the overall health of companion animals including dogs and cats, as well as reduce the opportunity for transmission of certain zoonotic diseases to humans.

Prior efforts to improve compliant use of medicaments in companion animals have been largely unsuccessful. These attempts include, for example, email reminders, refrigerator magnet countdowns, and personal data assistants (e.g. cell phone and the like) applets. For a reminder tool to be effective, it must be visible (i.e. not hidden in a drawer or other storage location) and it must not be able to be easily reset. Quick reset can allow the user to stop the reminder signal (beeping alarm, flashing lights, etc.) and "treat the animal later". In reality, stopping the reminder signal has the effect of delaying or preventing timely/appropriate dosing of the companion animal, thus leading to increased numbers and severity of medical complications associated with reduced compliance. Some negative consequences of reduced medication compliance include, for example, unnecessarily protracted illnesses, the development of more serious conditions than were originally being treated, and even death in the case of heartworm disease.

"Compliance tools", defined herein as devices/methods/software that improve the compliant use of drugs and medications, are well known in the art. For example, various timers, keychain pill reminders, electronic pill dispensers, wearable reminders (e.g. pendants or bracelets) are available to assist human patients in managing complicated medicament regimens. Such devices can be quite sophisticated, tracking multiple medication schedules. Some medication reminder devices are programmed by a physician or a pharmacist, while others can be set up by the patient. Some devices incorporate compliance tracking features in which the patient presses a "taken" button to store a time stamp when a medication is taken. Many medication reminder devices are geared toward prescriptions involving taking a medication multiple times within a day, mostly for a single medication and usually for a limited number of days. As such, it is relatively easy for the patient to remember what medicines the reminder are associated with.

Some actions are regularly taken at relatively long time intervals, such as the use of certain medications. For example, certain kinds of heartworm medications for dogs are given at monthly intervals. There are scheduling software products for computers and which could be used as a reminder for such an activity engaged in at a long interval schedule. There is also a known device for reminding a pet owner to administer a medication on a monthly cycle, sold as the ALRT Pet Reminder from ALR Technologies, Inc. of Bellingham, Wash. The ALR device is programmable, has light and an audible alert which are activated at a preset interval, and is provided in a shape, such as a dog paw shape or a bone shape. When the reminder device activates, the pet owner is alerted that some activity related to the pet should occur, but is not informed exactly what activity is called for. Beck attempted to address this problem by providing an electronic reminder device that displays a particular company logo, or brand, so that the companion animal owner might be reminded of what he or she was supposed to do (please see U.S. Pat. No. 6,665,966, to Beck & Associates). However, the patent discloses devices that have reset buttons, which can lead to reduced compliance. Further, the devices are designed to be mounted to a surface, and so fail to physically connect to the companion animals, making them quite easy to ignore. However, any device that is in close to the animal regularly could also be eaten, as dogs are known for ingesting unusual items. Therefore, any such device in regular close proximity must pose minimal risk to the animal's health if ingested.

U.S. Pat. No. 6,329,918 (to Moyer) describes an electronic animal identification tag and pager. The device allows a user to program and display a variety of data, including reminders. However, the relatively high cost of the device precludes its use as a stand-alone, disposable compliance tool. Further, because the device is programmable, the user can simply turn off any reminder alarm, thus defeating the purpose of the reminder.

GB 2 341 379 (to Thomson) describes an electronic identification device with integral display. The device similarly allows programmable display of information. Likewise, this device fails to provide a stand-alone, disposable compliance tool that poses little to no health risk if accidently ingested.

U.S. Pat. No. 6,502,060 (to Petronics) describes a clock for the attachment of a dog's collar that indicates the passage of time according to the dog's or pet's frame of reference. As above examples, the device is programmable and could be used to remind a human to medicate a companion animal, however, the device suffers from similar drawbacks with regard to its possible use as a compliance tool.

US 2002/0180591 (to Berstling) describes a small programmable reminder timer having an attachment means by which the device can be attached to items within a household or attached to a pet's collar or cage. Though potentially wearable, the device cannot be considered disposable, due to cost, nor can it be considered remotely safe to ingest.

Finally, the "DOG e MINDER®" (Dogeminder, patent pending status indicated on the company's website) is an electronic dog ID tag and dog care reminder system. The device is neither disposable nor small enough to be possibly safe to ingest.

As regards companion animal medication compliance, each of the above-mentioned devices absolutely requires a human to remember to program in, and not later ignore, a reminder. None of the prior art describes a compliance tool that, for example, is automatically activated at the point of use, and further, cannot be ignored because it is both attached to the companion animal and lacks a reset button. In general, previous compliance tools are generally unnecessarily complex, costly, and they do not provide as persistent and unavoidable a reminder as would be provided by a compliance tool that is safely affixed to dogs and/or cats.

Prior to the instant disclosure, no safe, effective, non-resettable, and reasonably-priced wearable companion animal compliance tool has been made. In particular, no disposable pet reminder tag, made of components that are non-toxic to a pet and designed to minimize complications if accidentally ingested, has been made. Accordingly, the present invention is directed to addressing the problem of companion animal medicine compliance by providing a new and improved compliance tool.

SUMMARY OF THE INVENTION

It is an object of the present invention to provide a novel, inventive, and useful companion animal drug/medication/medical treatment compliance tool.

It is a further object of the present invention to provide a compliance tool that is non-toxic and does not cause gastrointestinal damage to a dog, cat, or other companion animal, if accidentally consumed. Tools according to the instant disclosure have a reduced tendency to cause harm, as compared to existing tools, and for some animals, may be able to pass safely through the intestinal tract, if consumed.

In an embodiment, the compliance tool is a non-resettable, minimally harmful if ingested, one-time use, water resistant or waterproof, shock resistant or shockproof, pre-programmed medicine reminder tag for companion animals, including cats and dogs. The reminder tag may be activated by a user at the time the drug/medication/medical treatment is administered to the companion animal, and the tag may emit an audio and/or visual alarm after a set amount of time has passed. The tag is capable of being pre-programmed, by the manufacturer/maker, for any required reminder time interval, including but not solely, 1-day, 2-days, 3-days, 4-days, 5-days, 6-days, 7-days, 14-days, 30-days, 45-days, 60-days, 90-days, 6-months, 1 year, multiple years, or any other period of time, but is not capable of being turned off or re-programmed by the user. In some embodiments, the user may select from a manufacturer-pre-determined set of time intervals, but once the user selects the time and activates the compliance tool, the user can not turn it off.

These and other embodiments are disclosed or will be obvious from and encompassed by, the following Detailed Description.

BRIEF DESCRIPTION OF THE DRAWINGS

The following Detailed Description, given to describe the invention by way of example, but not intended to limit the invention to specific embodiments described, may be understood in conjunction with the accompanying Figures, incorporated herein by reference, in which.

DETAILED DESCRIPTION

An embodiment of the instant disclosure is a reminder tag made of a non-toxic material capable of withstanding water and shocks.

In an embodiment, the tag is "waterproof", which is defined herein as able to withstand water immersion up to about 1 meter in depth for up to about 8 hours and a two wash/rinse cycle, simulating the bathing of a dog. In another embodiment, the tag is "very waterproof", which is defined herein as able to withstand water immersion up to about 10 meters in depth for a duration of greater than 8 hours, and a 5 wash/rinse cycle. In another embodiment, the tag is "water resistant", which is defined herein as able to withstand contact with water, but not as able to withstand water as a tag that is "waterproof". An example of a "water resistant" tag according to the instant invention is one that can remain functional when subjected to at least one wash/rinse cycle and rain, but may not remain functional if submerged in water for more than 1 minute.

In another embodiment, the tag remains functional for at least twelve (12) hours in temperatures from about −20° C. to about 40° C. The tag may also be "static-proof", or resistant/able to remain functional when subjected to static electricity, including, but not limited to the static electricity accumulated on an animal's fur and/or collar. In a particular embodiment, the tag remains functional when repeatedly subjected to static electricity at levels comparable to those present/generated on a dog's coat, particularly in the vicinity of its collar and neck.

In another embodiment, the tag is "shockproof", which is defined herein as able to remain functional even when dropped from a height of at least 1.5 meters, at least three (3) times, or when impacted against the side of a stainless steel metal feeding bowl, five times consecutively, at speeds between one (1) and five (5) miles per hour. In another embodiment, the tag is "very shockproof", which is defined herein as able to remain functional even when dropped from a height greater than 20 feet and when impacted against the side of a stainless steel metal feeding bowl, 10 time consecutively, at speeds greater than ten (10) miles per hour. In another embodiment, the tag is "shock resistant", which is defined herein as being able to withstand being dropped from a height of between about 3 feet up to but not including 10 feet. "Non-toxic" is herein defined as containing no elements that, as of January 2011, have been identified as toxic to companion animals, including cats and dogs, by the US Pet Poison Control Association. Materials utilized in may include, but are not limited to plastics such as, acrylic, polyethylene terephthalate (PET), polyvinyl chloride (PVC), polypropylene (PP), ABS plastics, Nylon, polybutylene terephthalate (PBT), polyethylene, such as High Density Polyethylene (HDPE), High Impact Polypropylene (HIPP), polycarbonate, polystyrene such as high impact polystyrene (HIP), thermoplastic olefins (TPO's), polyesters, polyurethanes (PU), polyamides, multipolymer compounds, composites, any material known in the art and/or combinations thereof.

In an embodiment, the reminder tag may be activated by a user at the time the drug/medication/medical treatment is administered to the companion animal, and the tag may emit an audio and/or visual alarm after a set amount of time has passed. The tag is capable of being pre-programmed, by the manufacturer/maker, for any required reminder time interval, including but not solely, 1-day, 2-days, 3-days, 4-days, 5-days, 6-days, 7-days, 14-days, 30-days, 45-days, 60-days, 90-days, 6-months, 1 year, multiple years, or any other period of time, but is not capable of being turned off or programmed by the user. In some embodiments, the user may select from a manufacturer-pre-determined set of time intervals, but once the user selects the time and activates the compliance tool, the user can not turn it off.

In an embodiment, the user selects a time interval by activating a time interval selection sensing means prior to activating the tag by attaching it to the companion animal's collar. The time interval selection sensing means can be any appropriate means known in the art, including for example, a recessed button or switch housed within the tag, such as those recessed buttons used to reset electronic devices, such as wireless network routers, switches, and the like. In an embodiment, the interval selection sensing means may be a switch recessed within the tag such that the selection sensing means is difficult to accidentally activate by casual handling, but is readily activated by purposeful action, such as pressing a small cylinder, such as a free end of a paper clip, into the recess to activate the selection sensing means. In another embodiment, the selection sensing means is an inverted dimple portion of the tag's outer shell. The inverted dimple portion may resemble the protuberances found on many disposable cold cup lids that allow a server to indicate which beverage was dispensed into a cup by depressing the appropriate protuberance on the lid (e.g. "diet", "cola", "root beer", etc.) A companion animal owner may select an appropriate time interval based upon when the next dose of a companion animal medication is due to be administered. In an embodiment, several selection sensing means are present on a single tag. In one embodiment, a tag user may select among 14-days, 30-days, 45-days, and 60-days.

In another embodiment, the selection sensing means may take the form of multiple attachment engagement means, wherein attachment to one engagement means results in the selection of a specific time interval, and wherein attachment to a different engagement means results in the selection of a different time interval. In an embodiment, attachment to a first engagement means begins a 14-day time interval countdown culminating in the emission of an alarm signal after 14-days have elapsed. In an embodiment, attachment to a second engagement means begins a 45-day time interval countdown culminating in the emission of an alarm signal after 45-days have elapsed. In some embodiments, selection of a first time-interval prevents selection of a second time interval, or selection of any subsequent time interval. In another embodiment, activation of a time interval selection sensing means precludes activation of any other time interval selection sensing means.

Reminder tags according to the instant invention are non-toxic to the dog/cat if accidentally consumed. In an embodiment of the instant invention, the reminder tag is minimally harmful if accidentally ingested, and may even pass safely through the intestinal tract of some animals. A skilled person will appreciate that if a dog is capable of swallowing an object, the dog should also be able to pass the object through its digestive system. In some embodiments, the tags are able to remain functional even when bitten by a dog.

In an embodiment the tag or device is for one-time use, but it can be pre-programmed by the manufacturer/producer for any amount of time required (1-day, 2-days, 3-days, 7-days, 15-days, 30-days, 45-days, 60-days, 90-days, 6-months, 1 year, multiple years, or any other period of time). The device may be very shockproof, shockproof or shock resistant, and very waterproof, waterproof or water resistant, and generally made to withstand the environmental stresses typically associated with companion animal collars (e.g. environmental factors, like heat, cold, and water, and animal activity factors, like scratching, banging, impacting, biting or rubbing/brushing up against a variety of other objects, including the animal's collar, for example when the animal vigorously shakes its head).

In an embodiment, the tag or device cannot be turned off once activated. The alarm/alert (e.g. light and/or sound) may continue to remind the companion animal's owner that action is required (e.g. to provide the animal with medicine), until such time that the tag/device battery runs out.

In another embodiment, the tag/device has a light or suitable visual alarm/alert indicia that is visible from both sides, so that the alarm/alert will always be seen no matter which way it is facing.

In an embodiment, the tag/device is not larger than 40 mm in size and light-weight enough to attach and be worn easily by a small dog or small cat. In a particular embodiment, the tag/device is 32 mm or even smaller. In another embodiment, the tag attaches to an animal's collar, and further comprises an attachment receiving means, an attachment engagement sensing means, a battery, and a printed circuit board, each of which components is sealed within a hard, non-toxic casing. In some embodiments, the casing or housing is filled with a 2-component resin (i.e. an epoxy) to ensure the tag is water proof and shock proof.

In an embodiment, the tag is water resistant, shock resistant, non-toxic, single-use disposable animal medicine compliance tool. In some embodiments, the interior space is filled with an epoxy to prevent shifting of the components. In other embodiments, the tool further comprises an LED and/or sound generator.

Figure 1A:
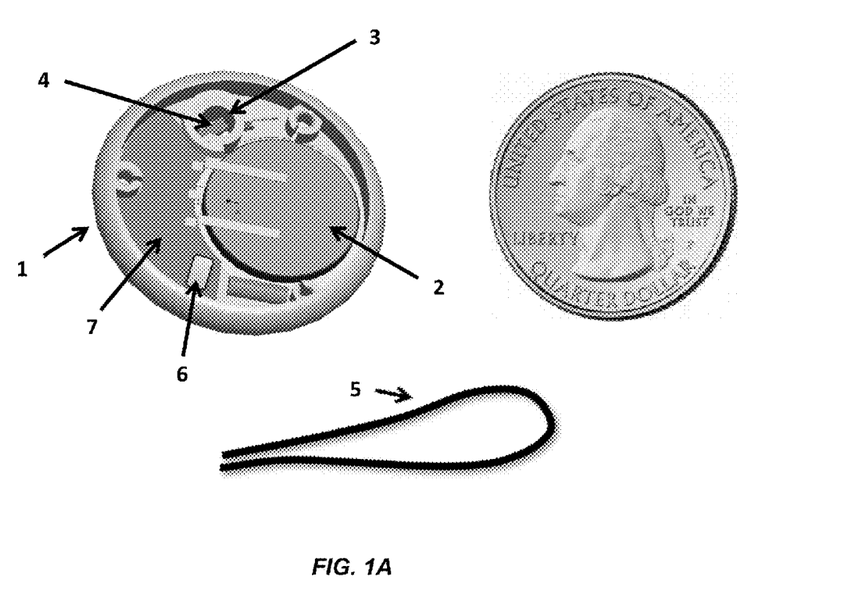
FIG. 1A depicts an animal reminder tag (1) according to the instant disclosure, alongside an image of a key and a US quarter.

In an embodiment, the attachment receiving means is a circular, square, slotted, or polygonal orifice formed by and passing completely through the tool. In other embodiments, the attachment receiving means is positioned outside the circular body or housing, as depicted in FIG. 1C.

In an embodiment, the attachment engagement sensing means is a filament, a frangible membrane, a removable tab, or an inductive sensor, such that when an attachment means penetrates the attachment receiving means, the tool is activated. In particular embodiments, the sensing means is a filament, such as that depicted in FIG. 1C.

In an embodiment, activation begins a pre-set countdown, wherein the period of time from activation to the end of the countdown is set by the manufacturer and cannot be adjusted or reset once the countdown has begun, and wherein at the end of the countdown, an alarm signal is emitted by the LED and/or sound generator to remind the companion animal caregiver to perform some activity, and wherein the signal cannot be terminated by the caregiver. In other embodiments, the count-down can be reset 1, 2, 3, or more times.

Figure 1B:
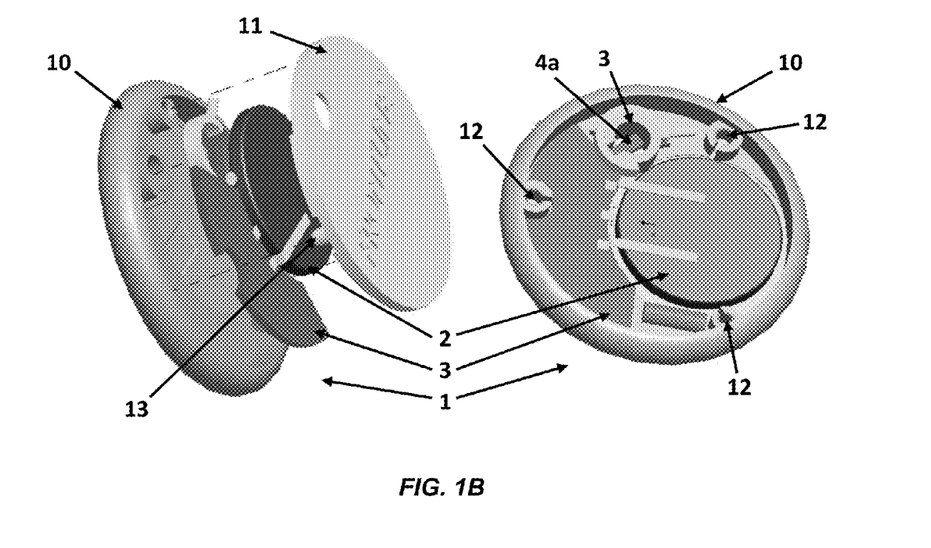
FIG. 1B provides a computer-rendering of the prototype animal reminder tag (1). The housing of the tag may be filled completely with a 2-component resin in order to make it waterproof and shockproof.
Figure 1C:
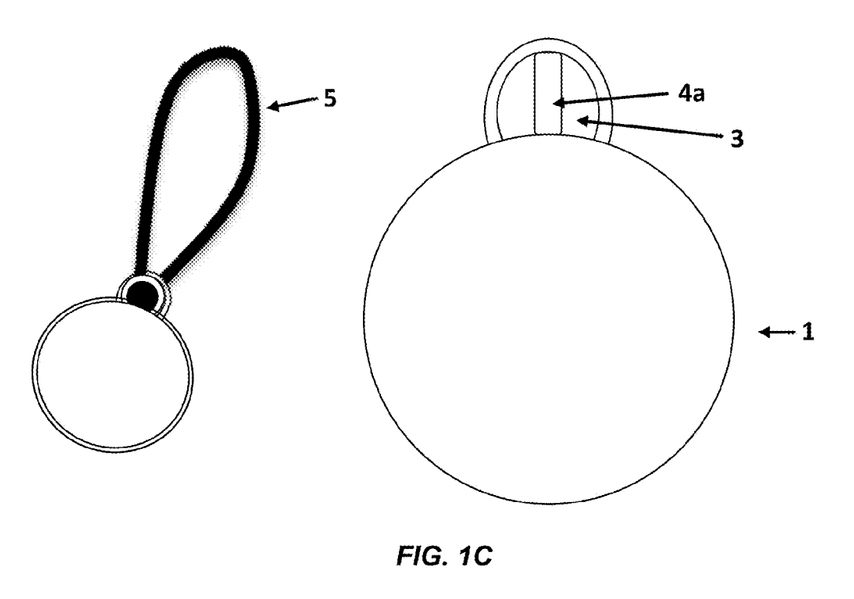
FIG. 1C depicts an alternative animal reminder tag (1), with orifice (3) and filament (4b) positioned outside the main circular body.

In an embodiment, the casing or housing (1) is in 2 pieces, as depicted in FIG. 1B; a housing base (10) and housing face (11). The housing base (10) may have situated therein one or more base-attaching means (12) for attaching to the housing face (11). Likewise, the housing face (11) may have situated therein one or more face-attaching means (13) for attaching to the housing base (10). In an embodiment, the base and face-attaching means are alternatively of the male or female variety. For example, when the base-attaching (12) means is male, the face-attaching means (13) is female, and vice-versa. In an embodiment, there are 1 to 5 base-attaching means (12) and 1 to 5 face-attaching means (13). In a particular embodiment, the housing face (11) has 3 face-attaching means (13) and the housing base (10) has 3 base-attaching means (12).

In an embodiment, the tag can be attached and removed from a companion animal's collar by a majority of adult human caregivers, including those with reduced hand strength due to increased age or degenerative medical conditions.

The invention also encompasses a method for providing a persistent reminder to perform an activity after a pre-set period of time has elapsed comprising the steps of attaching a tag (1) to a companion animal and allowing the tag (1) to remain attached to said companion animal for at least as long as the pre-set period of time, thereby providing the persistent reminder. In an embodiment, the method further comprises the steps of attaching the tag (1) to a collar already present around the neck of the companion animal. In another embodiment, the method further comprises the steps of threading or inserting an attachment means (5) through the compliance tool's attachment receiving means (3) and activating the compliance tool by activating the attachment engagement sensing means (4 or 4a). In an embodiment, the attachment means (5) is threading or a plastic strip, which breaks the engagement sensing means (4a) to activate the tag (1).

In an embodiment, the plastic strip breaks a filament to activate the tag (1). In another embodiment, the plastic strip breaks a frangible membrane to activate the tag (1). In another embodiment, the plastic strip activates an inductive sensor, breaks a circuit, or opens a circuit to activate the tag (1).

In yet another embodiment, the tag/device is branded (imprinted or embedded) with a product logo, such that the product and the tag/device can be easily coupled, and serve as an effective reminder to a companion animal's owner that a certain product is due to be administered to their pet. The tag may also any color, including white, black, red, blue, yellow, green, or any combination thereof. The color may be coordinated to a particular product. For example, "green" for FRONTLINE® products and red for HEARTGARD® products. "Special" or "limited edition" decorated tags, and the like, are also encompassed by the instant invention.

In some embodiments, the tag/device attaches to the collar of a companion animal with an attachment means. The attachment means can be any suitable connecting mechanism/device known in the art, including a loop, a metal ring, a carabiner, a flexible cord, a zip/cable-tie with a break-away to allow for easy removal of excess cable/cord, a hook-and-loop fastener, a cord as in FIG. 2 (5), etc.) In an embodiment, the attachment means may allow the inventive tag to be attached to a companion animal's existing collar attachments/rings (e.g. rings or loops to which a leash can be attached). Any mechanism/attachment means by which traditional pet tags or leashes are attached to collars is contemplated as potentially suitable for the instant invention. Pet tag holders disclosed in any of the following documents could be used to attach the inventive tag to a companion animal's collar. In an embodiment, the attachment means is small enough that it could safely pass through the animal's digestive tract if accidentally swallowed. In another embodiment, the tag is supplied with an attachment means, which means allows the tag to be affixed to a fixed object/surface, such as a refrigerator door, a cabinet, or a door-knob, such that the user has the option of affixing the tag to an animal's collar or to the fixed object. In an embodiment, the attachment means may be a cradle into which one could "snap" the tag, analogous to how one might "snap" a portable electronic device, such as a cell-phone, into a charger, docking station, or the like. A skilled person knows of many available attachments means, any of which may be employed in the practice of the instant invention.

Figure 2:
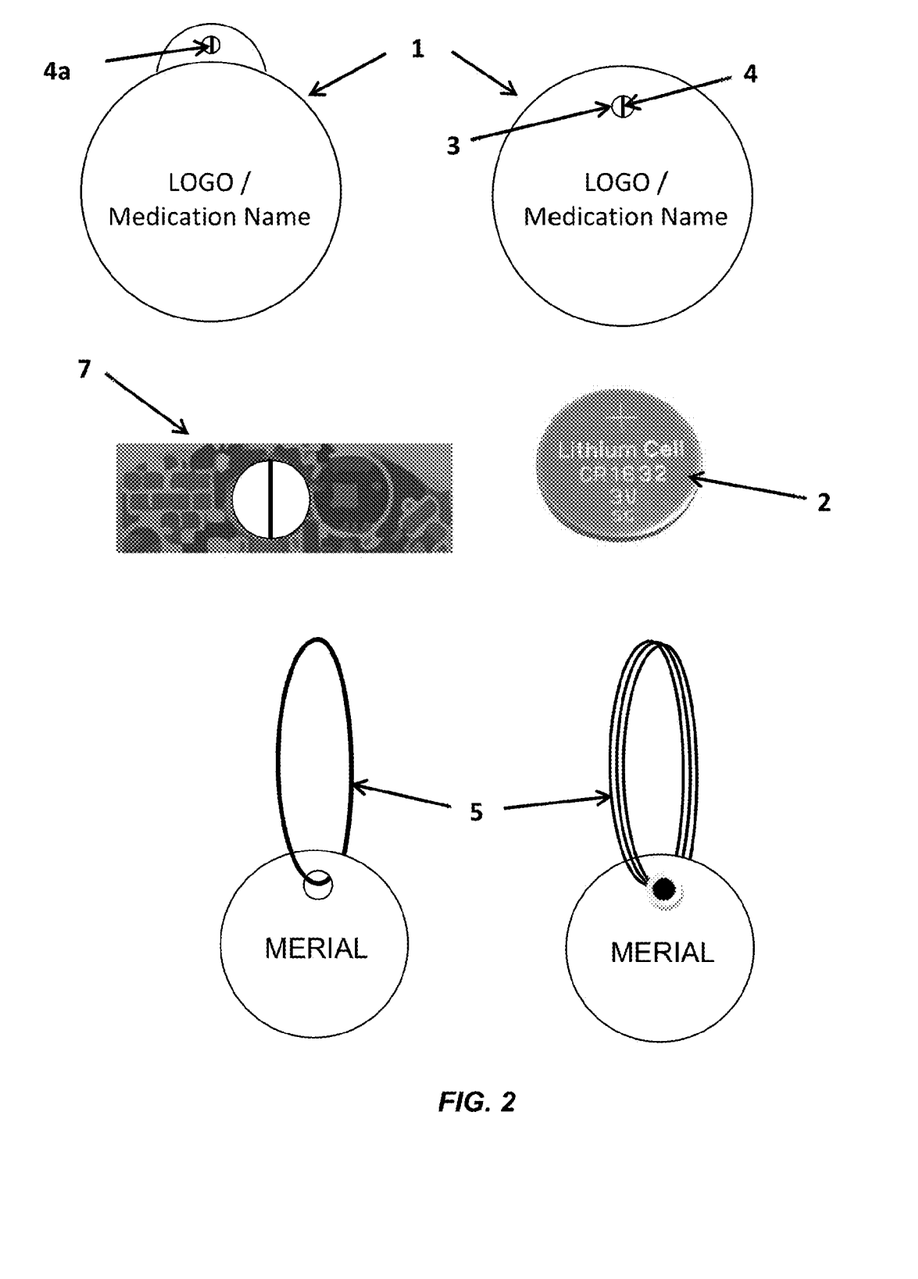
FIG. 2 depicts several animal reminder tags according to the instant disclosure, as well as several exemplary components: battery (2), attachment means (5), and printed circuit board (7)
Figure 3:
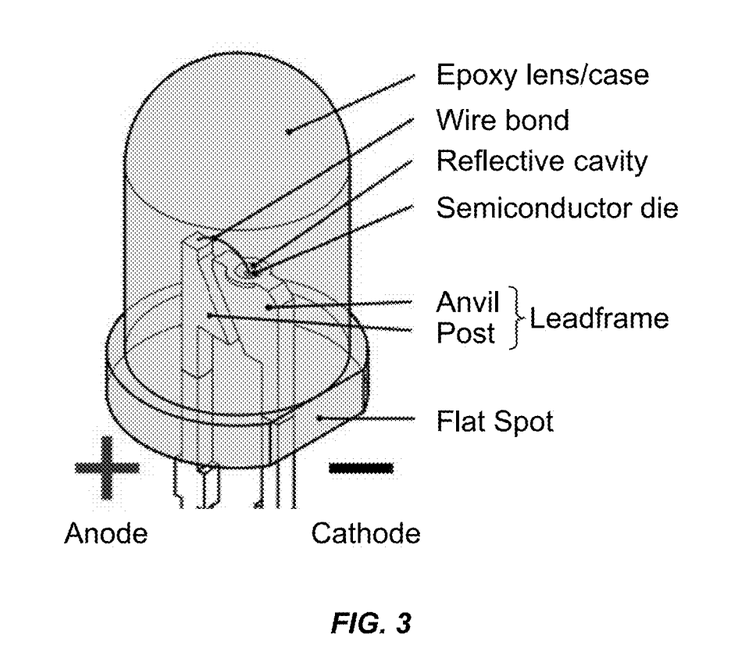
FIG. 3 shows an example reminder tag LED.

In some embodiments, the animal medicine reminder tag is activated when the attachment means is inserted through an attachment receiving means on the tag. In an embodiment, the attachment receiving means is hole (3) as depicted in FIG. 1. In an embodiment, engagement of the attachment means to the attachment receiving means activates the reminder tag by activating an attachment engagement sensing means. The attachment engagement sensing means may be any suitable sensing means known in the art. For example, the sensing means could be a filament (4) or a frangible membrane (4a) as depicted in FIG. 2. The sensing means could also be an induction coil, which may be activated by the passage of a small magnet through hole (3). Such a small magnet could be, for example, embedded in or affixed to the attachment means. Another form of activation may be to remove a tab that may be impeding connection between a battery and a pole. For example, in well-known small electronic devices, there are often small, plastic, removable tabs fixed between the metal contacts of the device and the battery terminals, such that the battery does not wear down prior to use (e.g. while awaiting purchase on a retail shelf).

In another embodiment, the reminder tag is small enough for dog or cat, contains a sufficiently small battery to minimize the health threat if ingested by the dog or cat. The tag is ideally shockproof, waterproof, and its light must be easily visible. In a preferred embodiment, the tag is easy to attach and remove from the dog or cat, and contains no components that could pose a health risk to the dog or cat if ingested. In another preferred embodiment, the tag is very shockproof and very waterproof, which terms are defined herein.

A variety of materials may be used in conjunction with the components of the tags described herein. The materials can be extruded, machined, or worked by a variety of means so as to provide the required shapes/sizes for the various components of the tags. The tags may be connected to the companion animal's collar by a variety of means, including snaps, hook and loop fastening, clasps, threads, and other attachments means known to those of skill in the art. For example, devices that are used to connect a pendant to a necklace or a bracelet could be used to connect the instant tags to the collars of companion animals. Among the materials useable with the present invention are polyethylene terephthalate (PET), polyvinyl chloride (PVC), polypropylene (PP), ABS plastics, Nylon, polybutylene terephthalate (PBT), polyethylene, such as High Density Polyethylene (HDPE), High Density Polypropylene (HDPP), polycarbonate, polystyrene (PS) such as high impact polystyrene (HIP), thermoplastic olefins (TPO's), polyesters, polyurethanes (PU), polyamides, and others. Examples of such additional plastics include those regularly used in the automotive industry for use in the manufacture of plastic parts including bumpers. According to the 2001 Automotive Plastics Report, published by Market Search, Inc., the most commonly used plastics are shown below:

TABLE 1

| Polymer | 1996 | 2001 | 2006 | 2011 |
|---|---|---|---|---|
| ABS | 201.8 | 173.5 | 142.8 | 116.8 |
| Nylon (PA) | 300.8 | 341.5 | 406.4 | 494.2 |
| Polycarbonate (PC) | 87.5 | 84.9 | 93.7 | 106.6 |
| Polyester (TP) | 133.0 | 129.2 | 144.0 | 161.1 |
| Polyester (TS) | 234.5 | 186.0 | 260.3 | 384.7 |
| Polyethylene (PE) | 365.6 | 437.2 | 509.0 | 587.5 |
| Polypropylene (PP) | 642.5 | 681.9 | 767.4 | 919.2 |
| Polypropylene (EDPM) | 157.9 | 375.1 | 436.0 | 509.7 |
| Polyurethane (PUR) | 831.4 | 792.5 | 914.2 | 1,123.2 |
| Polyvinylchloride (PVC) | 381.5 | 390.0 | 403.1 | 412.0 |
| Total | 5332.5 | 5592.8 | 6082.9 | 6,826 |

*2001 Automotive Plastics Report*, published by Market Search, Inc. This report is available at the plastics-car.org website.

In addition, the plastics used for the companion animal medicine reminder tag may be made of blends of two or more of the above-identified materials.

Foams for use with the instant invention include polystyrene foam such as Styrofoam, cellular foam such as PORON®, pure gum foam rubber, silicone foam, neoprene foam, polypropylene EPDM foam, polyethylene foam, polyurethane and others. Elastomeric materials include SANTOPRENE™, Silicone, NEOPRENE, Buna-N and others. One further alternative to foam materials are the use of air, liquid, or gel filled pillows made of for example polyethylene polypropylene flexible plastics. In a particularly effective embodiment, the tag interior is filled with an epoxy, which prevents the interior components from shifting and/or being damaged. "Epoxy", as used herein, is a thermosetting polymer formed from reaction of an epoxide "resin" with a polyamine "hardener". Any combination of resin and hardener may be used in the practice of the invention, though those combinations producing "epoxies" of minimal toxicity are preferred. Further, it is envisioned that any other minimally toxic, space-filling, component-immobilizing material could be used. For example, the immobilizing material could be a foam.

Each document cited in this text ("application cited documents") and each document cited or referenced in each of the application cited documents, and any manufacturer's specifications or instructions for any products mentioned in this text and in any document incorporated into this text, are hereby incorporated herein by reference; and, technology in each of the documents incorporated herein by reference can be used in the practice of this invention.

It is noted that in this disclosure, terms such as "comprises", "comprised", "comprising", "contains", "containing" and the like can have the meaning attributed to them in U.S. patent law; e.g., they can mean "includes", "included", "including" and the like. Terms such as "consisting essentially of" and "consists essentially of" have the meaning attributed to them in U.S. patent law, e.g., they allow for the inclusion of additional ingredients or steps that do not detract from the novel or basic characteristics of the invention, i.e., they exclude additional unrecited ingredients or steps that detract from novel or basic characteristics of the invention, and they exclude ingredients or steps of the prior art, such as documents in the art that are cited herein or are incorporated by reference herein, especially as it is a goal of this document to define embodiments that are patentable, e.g., novel, non-obvious, inventive, over the prior art, e.g., over documents cited herein or incorporated by reference herein. And, the terms "consists of" and "consisting of" have the meaning ascribed to them in U.S. patent law; namely, that these terms are closed ended. The singular terms "a", "an", and "the" include plural referents unless context clearly indicates otherwise. Similarly, the word "or" is intended to include "and" unless the context clearly indicates otherwise.

Having thus described in detail embodiments of the present invention, it is to be understood that the invention defined by the appended claims is not to be limited to particular details set forth in the above description as many apparent variations thereof are possible without departing from the spirit or scope of the present invention.

What is claimed is:

1. A water resistant, shock resistant, non-toxic, single-use disposable animal medicine compliance reminder tag, comprising
   (a) an attachment means that attaches the to an animal or an animal's collar;
   (b) an attachment receiving means:
   (c) an attachment engagement sensing means;
   (d) a pre-set time interval countdown which cannot be adjusted or reset once the countdown has begun; and
   (e) an alarm,
   wherein the reminder tag is activated when the attachment means penetrates the attachment receiving means so as to break a circuit in the attachment engagement sensing means.

2. The reminder tag of claim 1, which is designed to pass safely through the tract gastro-intestinal of the animal if accidentally swallowed.

3. The reminder tag of claim 1 further comprising conponents which are the attachment e a ement sensing means, a battery and a printed circuit board, each of these components being sealed within a hard. non-toxic casing wherein the interior space of the casing is filled with an epoxy to prevent shifting of the components.

4. The reminder tag of claim 1 wherein the alarm comprises an LED and/or sound generator.

5. The reminder tag of claim 1 wherein the attachment receiving means is a circular, square, slotted, or polygonal orifice formed by and passing completely through the tag.

6. The reminder tag of claim 5 wherein the attachment engagement sensing means is a filament, a frangible membrane, or a removable tab.

7. The reminder tag of claim 6 wherein the sensing means is a filament.

8. The reminder tag of claim 1, wherein activation of the reminder tag begins the pre-set time interval countdown.

9. The reminder tag of claim 8, wherein at the end of the countdown the alarm's signal is activated.

10. The reminder tag of claim 9, wherein the alarm's signal cannot be terminated by the caregiver.

11. The reminder tag of claim 8 wherein the alarm's signal is visible and/or audible from both sides of the tool.

12. The reminder tag of claim 8 wherein the pre-set time interval countdown is from 1 day up to and including 6 months.

13. The reminder tag of claim 12 wherein the pre-set tine interval countdown is 2 weeks, 3 weeks or 1 month.

14. The reminder tag of claim 12 wherein the pre-set time interval countdown is 1 month or 45 days.

15. The reminder tag of claim 1, wherein the attachment means is selected from the group consisting of a loop, a metal ring, a carabiner, a flexible cord, a zip/cable-tie, a hook-and-loop fastener, and a cord.

16. The reminder tag of claim 1, which further comprises an additional attachment engagement sensing means which enables the selection of a second time interval countdown, wherein an attachment means penetrates an attachment receiving means so as to break a circuit in the additional attachment engagement sensing means.

17. The reminder tag of claim 1 which further comprises a time interval selection sensing means which enables the user to select from a variety of pre-set time interval countdowns prior to activating the tag.

18. The reminder tag of claim 17 wherein the pre-set time interval selected is an appropriate time interval based upon when the next dose of the animal medicine is due to be administered.

19. The reminder tag of claim 1, wherein the pre-set time interval countdown is pre-set by the manufacturer.

20. A method for providing a persistent reminder to perform an activity to a companion animal after a pre-set period of time has elapsed comprising the steps of:
   a. attaching a reminder tag according to any one of claims 1 to 14 or claims 15 to 10 to the companion animal;
   b. allowing the compliance tool to remain attached to said companion animal for at least as long as the pre-set time interval countdown period, thereby providing the persistent reminder.

21. The method of claim 20 further comprising the steps of attaching the reminder tag to a collar already present around the neck of the companion animal.

22. The method of claim 21 further comprising the steps of threading or inserting the reminder tag's attachment means through the reminder tag's attachment receiving means and activating the reminder tag by using the attachment means to penetrate the attachment receiving means so as to break a circuit in the attachment engagement sensing means.

23. The method of claim 22 wherein the alarm is battery operated.

24. The method of claim 23 wherein the alarm is a perpetual flashing of an LED light and/or an acoustic signal.

25. The method of claim 24 wherein the flashing and/or acoustic signal persists until the battery discharges below a minimum required voltage.

* * * * *